United States Patent
Gubler et al.

(10) Patent No.: US 9,006,608 B2
(45) Date of Patent: Apr. 14, 2015

(54) PROCESS FOR THE ADJUSTMENT OF A LASER LIGHT SPOT FOR THE LASER PROCESSING OF WORK PIECES AND A LASER DEVICE FOR THE PERFORMANCE OF THE PROCESS

(75) Inventors: Ulrich Gubler, Rotkreuz/ZG (CH);
Daniel Vogler, Lucerne (CH);
Christoph Raab, Lucerne (CH)

(73) Assignee: Leister Technologies AG, Kagiseil (CH)

( * ) Notice: Subject to any disclaimer, the term of this patent is extended or adjusted under 35 U.S.C. 154(b) by 513 days.

(21) Appl. No.: 13/326,640

(22) Filed: Dec. 15, 2011

(65) Prior Publication Data

US 2012/0187099 A1 Jul. 26, 2012

(30) Foreign Application Priority Data

Jan. 21, 2011 (EP) .................... 11000485

(51) Int. Cl.
*B23K 26/06* (2014.01)
*B23K 26/067* (2006.01)
*B23K 26/073* (2006.01)
(Continued)

(52) U.S. Cl.
CPC ......... *B23K 26/0734* (2013.01); *B23K 26/0608* (2013.01); *B23K 26/0652* (2013.01); *B23K 26/0676* (2013.01); *B23K 26/3246* (2013.01); *B29C 65/16* (2013.01); *B29C 65/1664* (2013.01); *B29C 65/1674* (2013.01)

(58) Field of Classification Search
CPC ... B23K 26/06; B23K 26/0604; B23K 26/067
USPC ............... 219/121.6, 121.61, 121.73, 121.75, 219/121.76, 121.77
See application file for complete search history.

(56) References Cited

U.S. PATENT DOCUMENTS

| 7,009,138 B2 | 3/2006 | Amako et al. | |
|---|---|---|---|
| 7,255,806 B2 * | 8/2007 | Yoshimura et al. | 216/65 |
| 2003/0098295 A1 | 5/2003 | Kawamoto et al. | |

(Continued)

FOREIGN PATENT DOCUMENTS

| EP | 0 184 290 A1 | 6/1986 |
|---|---|---|
| EP | 1 449 610 A1 | 8/2004 |

(Continued)

OTHER PUBLICATIONS

European Search Report for corresponding European Application No. EP 11 00 0485 Issued Jun. 21, 2011.

*Primary Examiner* — Brian Jennison
(74) *Attorney, Agent, or Firm* — Renner, Otto, Boiselle & Sklar, LLP (57) ABSTRACT

The invention relates to a process for the adjustment of a laser light spot of high intensity for the laser processing of work pieces as well as a laser device for performing the proposed process. The laser device comprises a laser emitting a laser beam and at least one focusing lens for converging the laser beam as well as an optical operating element for adjusting the beam diameter of the laser beam. The invention proposes to use as operating element a diffractive optical element that separates the laser beam emitted by the laser into partial laser beams, with the partial laser beams generated by the diffractive optical element being assembled to form a resulting laser beam that acts on the work piece. By means of a suitable design of the diffractive optical element it is possible to adjust, in particular enlarge, the diameter of the laser light spot as required.

17 Claims, 7 Drawing Sheets

(51) Int. Cl.
*B23K 26/32* (2014.01)
*B29C 65/16* (2006.01)

(56) References Cited

U.S. PATENT DOCUMENTS

2005/0070035 A1    3/2005  Yazaki et al.
2006/0054606 A1*   3/2006  Amako .................. 219/121.73
2007/0145024 A1    6/2007  Salama et al.
2007/0151961 A1*   7/2007  Kleine et al. ............ 219/121.72

FOREIGN PATENT DOCUMENTS

EP    1 524 096 A1    4/2005
WO    2009/045320 A2  4/2009

* cited by examiner

PROCESS FOR THE ADJUSTMENT OF A LASER LIGHT SPOT FOR THE LASER PROCESSING OF WORK PIECES AND A LASER DEVICE FOR THE PERFORMANCE OF THE PROCESS

CROSS-REFERENCE TO RELATED APPLICATION

The present application claims priority under 35 USC §119 to European Patent Application No. 11 000 485.0 filed Jan. 21, 2011, the entire disclosure of which is incorporated herein by reference.

TECHNICAL FIELD OF THE INVENTION

The invention relates to a process for the adjustment of a high intensity laser light spot for the laser processing of work pieces, preferably for laser plastic welding of work pieces to be joined, by means of a laser device, as well as a laser device for performing the process. The laser device comprises a laser emitting a laser beam and at least one focusing lens for converging the laser beam as well as an optical operating element for adjusting the beam diameter of the laser beam, with the optical operating element configured as a diffractive optical element that separates the original laser beam into a bundle of partial laser beams that are directed at the work pieces.

DESCRIPTION OF THE RELATED ART

When processing work pieces by means of lasers, it is common to focus the unfocussed laser radiation that is emitted by the laser and is typically collimated to a smaller beam cross-section by means of an optical focusing system, and to direct the focused laser beam onto the surface of the material of the work pieces to be processed. The beam axis of the focused laser beam may be immobile relative to the material of the work pieces, or may be moved along a processing path. At the same time, the reduced diameter of the focused laser radiation that results from the focusing and determines the focus plane is kept in the area of an interaction surface of the work pieces that absorbs at least partially the laser radiation. The laser radiation used for the processing of the material may consist of one or more beams that are generated with one or more radiation sources. Material processing processes by means of a laser where the focused laser radiation enters the material of the work pieces to be processed include drilling, abrasion, cutting, or welding, for example.

When processing and joining work pieces by means of laser radiation, the size and the form of the laser beam focused on the work pieces play an important role. Of special importance is a correctly adjusted power density distribution within the generated laser high intensity light spot. Laser sources usually have a round, Gauss-type beam profile that needs to be transformed to the desired size and the required form by means of suitable measures. In this context, the use of diffractive optical elements (DOEs) for the shaping of the beam specifically for laser plastic welding and laser soldering is known from some patent disclosures. Regarding prior art, we refer to the publications US 2003/098 295 A1, U.S. Pat. No. 7,009,138 B2, EP 1 449 610 A1, EP 1 524 096 A3, EP 0 184 290 A1, and WO 2009/045 320. The citations from the prior art all aim at dividing the laser beam emitted by the laser into partial beams by means of a DOE in order to reach different processing spots separately from each other, and to act simultaneously or quasi-simultaneously on the work pieces at the associated processing spots. The function and the arrangement of common diffractive optical elements is known to a person skilled in the art so that no explanation is required in this context.

With laser plastic welding, for example, the diameter of the high intensity laser light spot that can be generated on the work pieces for the laser processing of work pieces by means of a fiber-coupled diode laser as laser source is given by the fiber core diameter and the imaging system and can only be influenced to a limited extent with the usual optical operating elements. However, in many cases it is necessary to generate a welding seam that is distinctly wider than the laser light spot diameter. If such a wider welding seam is to be achieved with a continuous contour process, it is necessary to either make two or more passes along the welding contour with a laterally displaced laser beam, or to re-adjust the imaging system in such a way that the focus plane does not coincide with the interaction surface, e.g. the surface of the work pieces. When a scanner is used for the quasi-simultaneous transmission of the laser beam to the work pieces, the adjustment of the size of the laser light spot, also by means of the fiber core diameter, the collimating lens, and the focusing lens—typically a plane field lens with a certain operating field—is only possible to the extent described above. If a wider welding line is desired, the welding contour must also be traced several times at different times.

In general, the energy transfer to the work pieces is optimal if the interaction surface of the work pieces and the focal plane of the laser device coincide. Here, the laser light spot has a diameter of highest energy density that is determined by the laser device. If the width of the welding seam or the welding contour is wider than the diameter of the laser light spot that is determined by the optical system, this will always require additional process time which has an negative effect on production costs and is therefore undesirable.

In view of the prior art referred to above, the invention addresses the problem of proposing a method for enlarging the optimal laser light spot diameter associated with the focal plane to a certain desired width that corresponds to the width of the welding seam to be produced.

SUMMARY OF THE INVENTION

According to the invention, this problem is solved by a process and a laser device with the characteristics described herein.

A core idea of the invention is to divide, by means of a diffractive optical element (DOE), an original laser beam collimated typically by a collimating lens into partial laser beams, and to re-compose the partial laser beams, resulting in a bundle of beams that forms an improved laser beam that is directed at the work pieces and acts thereon. Specifically, the number of the partial laser beams, their lateral spacing, their diameter, and the total diameter of the bundle of beams can be determined by means of the DOE.

In the process according to the invention for adjusting a high intensity laser light spot for the processing of work pieces, for example for the laser plastic welding of work pieces to be joined, a laser device is used that comprises a laser emitting a laser beam and at least one focusing lens for converging the laser beam, as well as an optical operating element for adjusting the diameter of the bundle of beams. According to the invention, the diameter of the bundle of beams and the diameter of the laser light spot on the work pieces determined by the former is enlarged by means of a diffractive optical element as optical operating element, preferably in the focal plane, transversely to its direction of extension, to a desired dimension by assembling the partial laser beams generated by the diffractive optical element. For this purpose, the partial laser beams generated from the original laser beam are composed, with overlaps and/or gaps of any desired form, to form a total laser beam that is directed at the work pieces, with the total laser beam acting on a single processing spot. The total diameter of the laser beam is determined by the diffractive optical element. An enlargement of the diameter of the laser light spot in the focal plane obviously leads also to an enlargement of the laser light spot diameter more or less distant from the focal plane, i.e. above and below the focal plane. It is optimal if the focal plane and the interaction surface share a common plane during the laser processing of the work pieces by means of the high intensity laser light spot. Of course, regarding the work pieces, the imaging system of the laser device may also be arranged at such a distance that the focal plane of the laser device and the interaction surface, for example the contact surface of the work pieces, do not coincide.

In one embodiment of the invention, the partial laser beams generated by the diffractive optical element overlap at their edges, resulting in a continuous beam profile being formed due to the lateral overlap. The bundle of beams forming the resulting laser beam generates on the work pieces a gapless laser light spot for processing the work pieces that is moved relative to the work pieces.

In another embodiment of the invention, the partial laser beams generated by the diffractive optical element do not overlap at their edges, resulting in a one-dimensional or two-dimensional beam profile of discretely spaced dots being formed. On the work pieces, the resulting laser beam generates a dot pattern that is also moved relative to the work pieces.

In order to process the work pieces by means of electromagnetic energy, in the arrangement of the partial laser beams relative to each other that is described above, a total laser beam is formed from the partial laser beams that acts on a single processing point via the laser light spot. The laser light spot may comprise overlaps of partial laser beams or gaps of any shape between the partial laser beams. In none of the cases, the temperature profile that can be generated in this way in the work pieces is homogeneous. However, for physical reasons of thermal conductivity, an equalization of the temperature takes place on the work pieces between places of different temperature of the temperature profile. Specifically, due to interaction in the material of the work pieces, the dot pattern of the beam profile is brought together to form a continuous active profile.

In addition to generating the partial laser beams for a certain bundle of beams diameter, the diffractive optical element is also capable of dividing the energy of the original laser beam evenly or differently among the partial laser beams, depending on the design of the DOE. Depending on the intended use of the process for different processing purposes of work pieces or for work pieces of different material, a cup-shaped beam profile or one of some other special form may be more advantageous for the processing than a plateau-shed beam profile, and can be achieved with a specially designed DOE.

In a preferred embodiment of the process according to the invention, the partial laser beams generated by the diffractive optical element for the resulting beam profile are weighted in terms of intensity and/or power so that different beam profiles can be formed for the laser light spot. The weighting of the power of the partial beams is achieved by the specific design of the DOE. Different weightings require a completely new DOE design to be developed.

Preferably, the weighting of the partial beams for a cup-shaped beam profile that will generate a resulting laser light spot on the work pieces is performed in such a way that the intensity or the power is stronger at the edge than in the center. In relation to the center of the laser light spot, the intensity of the beam profile of the resulting laser beam at the profile points determined by the coordinates (X, Y) is determined by the function $$I(x, y) = \frac{P}{2\pi b} \frac{1}{\sqrt{b^2 - r^2}}$$

with b designating the radius, P the total intensity, and r the distance of the profile point in question from the center of the resulting laser beam. The distance of the profile point in question is $$r = \sqrt{x^2 + y^2}$$

with r being smaller than b.

Generally, the proposed process according to the invention can be used in conjunction with a fiber laser or a diode laser. Fiber lasers are a special form of the solid state laser and have a significantly better beam quality than diode lasers. The laser beam exiting from the laser aperture is distinguished by an extremely small divergence. The energy density distribution of the beam profile, i.e. the Gauss profile of the energy density, is multiple times narrower than that of a diode laser of the same power. This makes a fiber laser especially well suited for the laser processing of work pieces.

In the invention, it is simple to achieve different sizes of the bundle of laser beams by means of diffractive optical elements of different designs. Advantageously, for different adjustments of the bundle of beams and the resulting laser light spot, interchangeable DOEs of different design are used that are employed without precise alignment relative to the original laser beam, specifically a lateral alignment transversely to the direction of the laser beam. In order to make this possible, a number of standard cells are arranged next to each other with the same spacing, with different spacing, or no spacing at all relative to each other to form the diffractive optical element. It offers advantages if the diffractive optical element is arranged between a collimating lens downstream from the laser and the focusing lens of the laser device. Optimally, it is arranged at a distance from the focusing lens that corresponds to the focal length of this focusing lens. In principle, it is also possible to arrange the DOE at a small distance behind the focusing lens as long as the lack of focus caused by this arrangement remains within a range that is acceptable for the specific application.

In the laser device according to the invention for the laser processing of work pieces that comprises at least one laser emitting a laser beam and at least one focusing lens for converging the laser beam, as well as an optical operating element for adjusting the beam diameter of the laser beam, the optical operating element consists of a diffractive optical element that divides the original laser beam into a bundle of partial laser beams and enlarges the diameter of the laser light spot. The diffractive optical element is configured in such a way that a resulting beam profile composed of the generated partial laser beams is directed at the focal plane. The diffractive optical element enlarges the diameter of the laser light spot on the work pieces—preferably in the focal plane and transversely to the direction of extension of the focal plane—in relation to the diameter of the original laser beam to the desired dimension when entering the diffractive optical element. According to the invention, the partial laser beams are composed to form a total laser beam that has overlaps of the partial laser beams and/or gaps of any shape between the partial laser beams. The total laser beam is always directed at a single processing spot, acting exclusively on this spot.

Preferably, the diffractive optical element comprises a number of standard cells that are arranged side-by-side with or without spacing, with the spacing being even or uneven. Due to the replication of a standard cell, the adjustment of the DOE in the beam path is no longer of importance.

In a preferred embodiment of the laser device according to the invention, the partial laser beams generated by the diffractive optical element are weighted in terms of intensity and/or power in such a way that for the resulting laser light spot a beam profile is generated whose intensity increases from the center towards the edge. Preferably, the diffractive optical element is arranged between a collimating lens downstream from the laser and the focusing lens of the laser device. In the laser device, the DOE is interchangeable and can be replaced without precise alignment, especially laterally, in relation to the laser beam. The laser device may be arranged in or on a processing head of a laser plastic welding device that comprises preferably a scanner unit with at least one deflecting mirror.

Below, the invention is explained in detail with reference to several embodiments shown in the drawing. Additional characteristics of the invention are given in the following description of the embodiment of the invention in conjunction with the claims and the attached drawing. The individual characteristics of the invention may be realized either individually by themselves or in combinations of several in different embodiments of the invention. In schematic views,

DETAILED DESCRIPTION OF THE INVENTION

Figure 1:
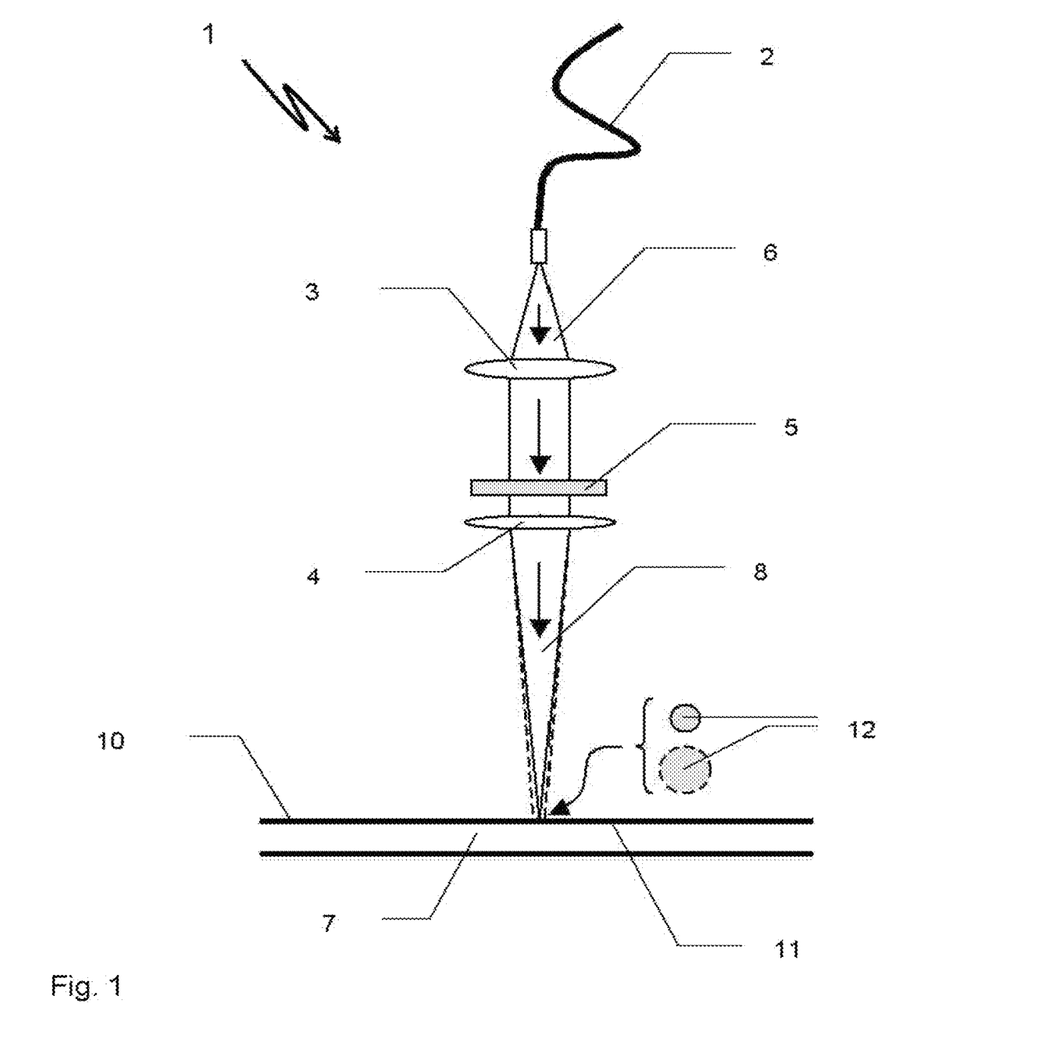
FIG. 1 shows a first laser device according to the invention with no scanner unit.

A laser device 1 shown in principle in FIG. 1 comprises a laser (not shown), an optical fiber 2 following the laser, a collimating lens 3, and a focusing lens 4, as well as a diffractive optical element 5 (DOE) that is arranged between the collimating lens 3 and the focusing lens 4. From the optical fiber 2, an original laser beam 6 exits that is collimated by the collimating lens 3, is shaped by the following DOE 5, and, focused by the focusing lens 4, is directed at a work piece 7 as a resulting laser beam 8. The laser beam 8 is composed of partial laser beams 9 (not shown), with the focal plane 10 of the laser device 1 coinciding with the surface 11 of the work piece 7. On the surface 11 of the work piece 7, the resulting laser beam 8 generates a laser light spot 12 of high intensity for the laser processing of the work piece 7. The diameter of the laser light spot 12 depends on the design of the DOE 5. By means of different DOEs 5, it is possible to generate laser light spots 12 of different diameters on the work piece 7. FIG. 1 shows two laser light spots 12 of different sizes as well as the associated laser beams 8 with a solid and a dotted circumferential line.

Figure 2:
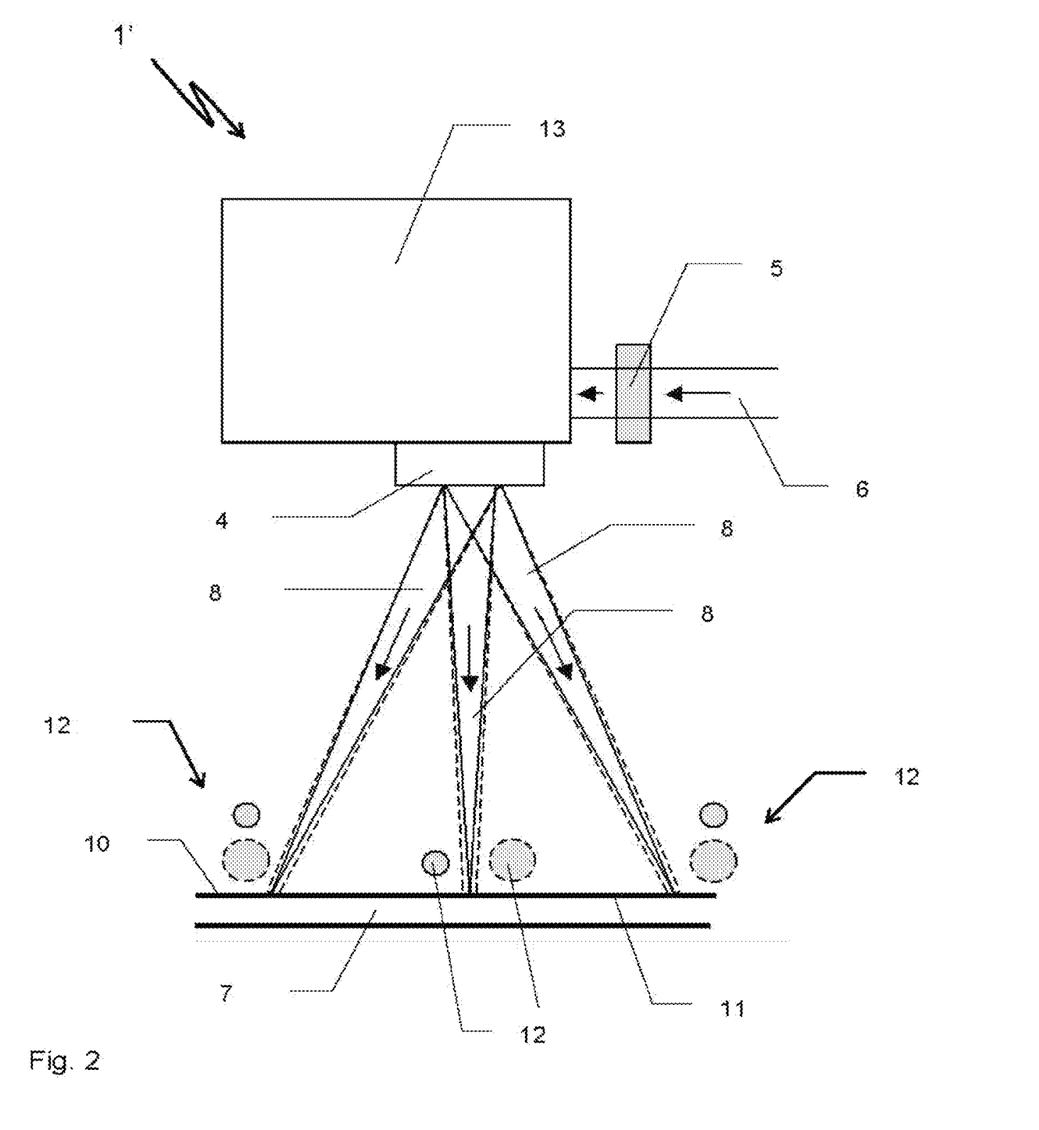
FIG. 2 shows a second laser device according to the invention with a scanner unit.

FIG. 2 shows another laser device 1 according to the invention that differs from the laser device 1 shown in FIG. 1 in principle by comprising a scanner unit 13 that is arranged between the DOE 5 and the focusing lens 4. By means of the scanner unit 13, the resulting laser beam 8 can be deflected after the DOE 5 one-dimensionally or two-dimensionally relative to the optical axis of the focusing lens 4. The moving laser beam 6 is shown in FIG. 2 in three positions relative to the work piece 7. In any position within the possible work area on the surface 11 of the work piece 7, it generates a laser light spot 12 in accordance with FIG. 1.

Figure 3:
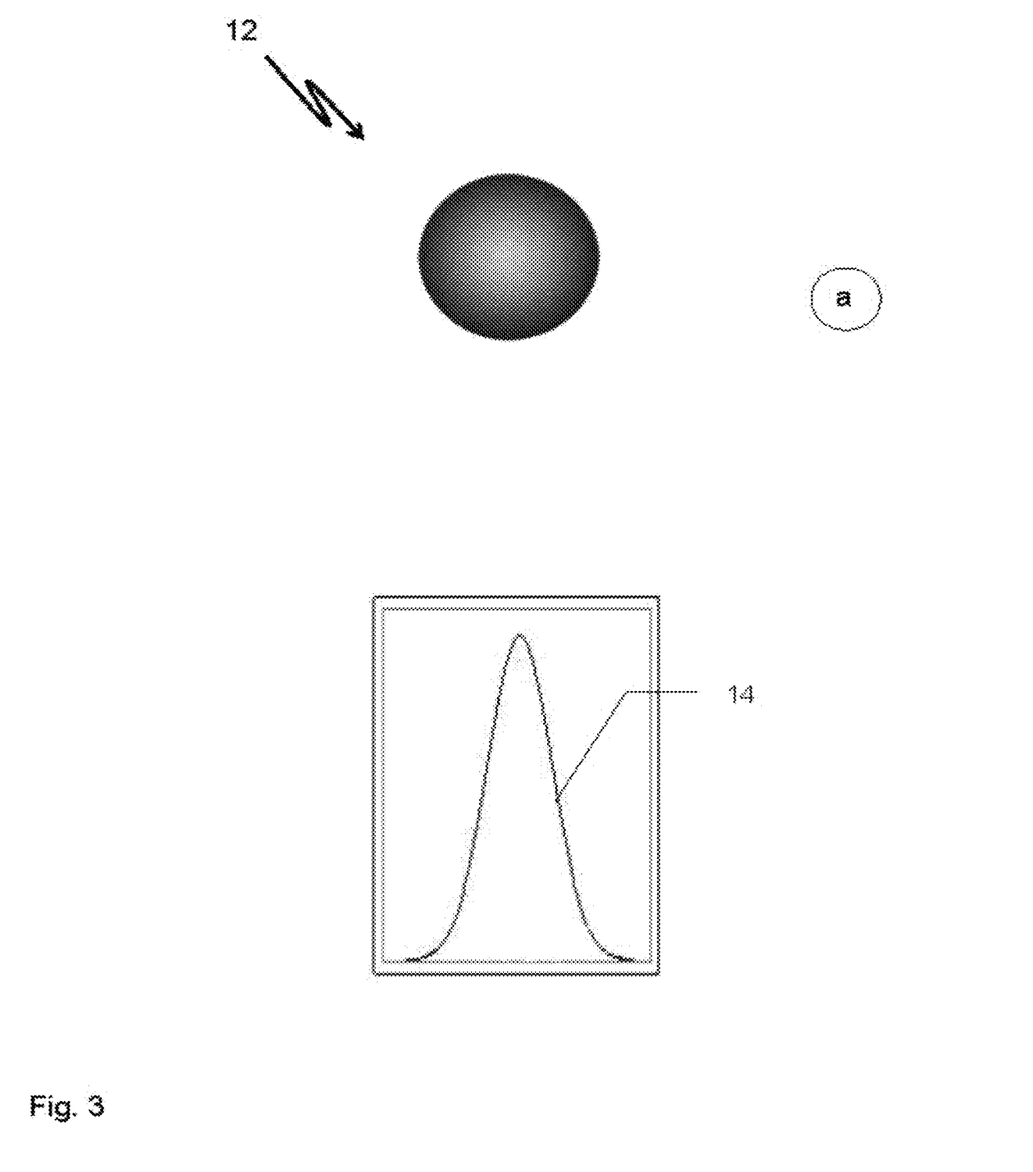
FIG. 3 shows a laser light spot of a diode laser (FIG. 3a) and a cross-section through the associated beam profile (FIG. 3b), without a DOE arranged in front of the focusing lens.
Figure 4:
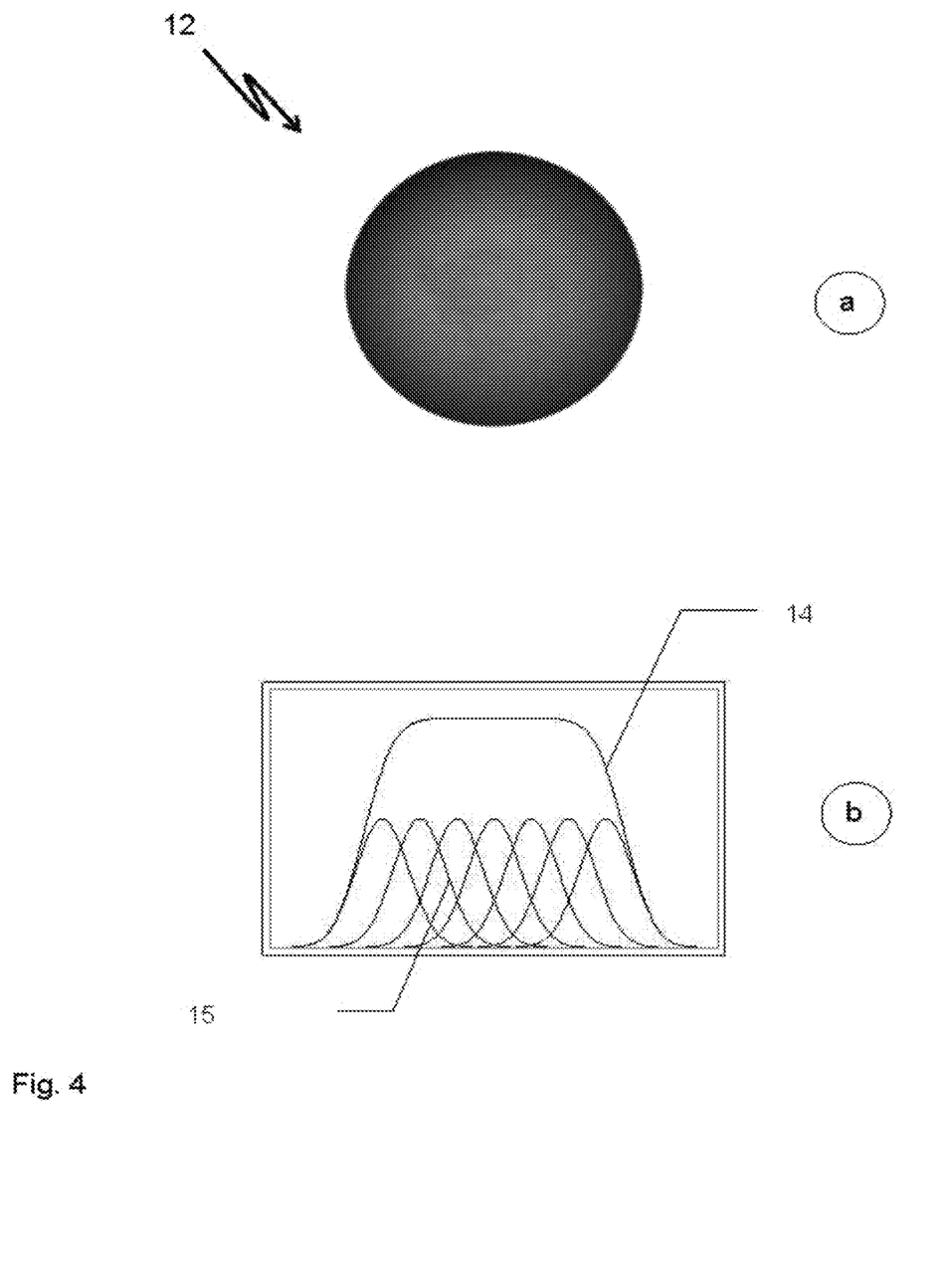
FIG. 4 shows a laser light spot of a diode laser (FIG. 4a) and a cross-section through the associated beam profile (FIG. 4b), with a DOE arranged in front of the focusing lens and a uniform intensity of the laterally overlapping partial laser beams.

FIG. 3 shows the laser light spot 12 of an original laser beam 6 emitted by a diode laser on a work piece 7 as well as the associated cross-section of the beam profile 14. In its simplest form, a diode laser consists of a laser diode, possibly with optical systems for collimation and focusing. The beam profile 14 according to FIG. 3b shows the typical Gauss shape with a wide bell curve that corresponds to the laser light spot 12 shown in FIG. 3a. In FIG. 4a, FIG. 4 shows a laser light spot 12 and in FIG. 4b the associated beam profile 14 that are generated by one of the laser devices 1, 1' shown in FIGS. 1, 2. It can be seen from the beam profile 14 that the DOE generates a number of partial laser beams 9 that overlap laterally and form a largely homogeneous resulting laser beam 8 that, in turn, generates the laser light spot 12. The laser beam profile 14 is formed by the superimposition of Gauss-shaped partial laser beam profiles 15 that have a uniform intensity distribution. A partial laser beam 9 can be associated with each partial beam profile 15. Since the partial beam profiles 15 overlap significantly laterally, FIG. 3b indicates that the partial beams 9 also extend while overlapping each other laterally. The weighting of the intensity of the partial beams 9 is performed uniformly by the DOE 5 so that the laser light spot 12 has a tophat-shaped beam profile 14 with a flat area and steeply sloped flanks. The added partial beam profiles 15 improve the less than optimal beam quality of the diode laser significantly.

Figure 5:
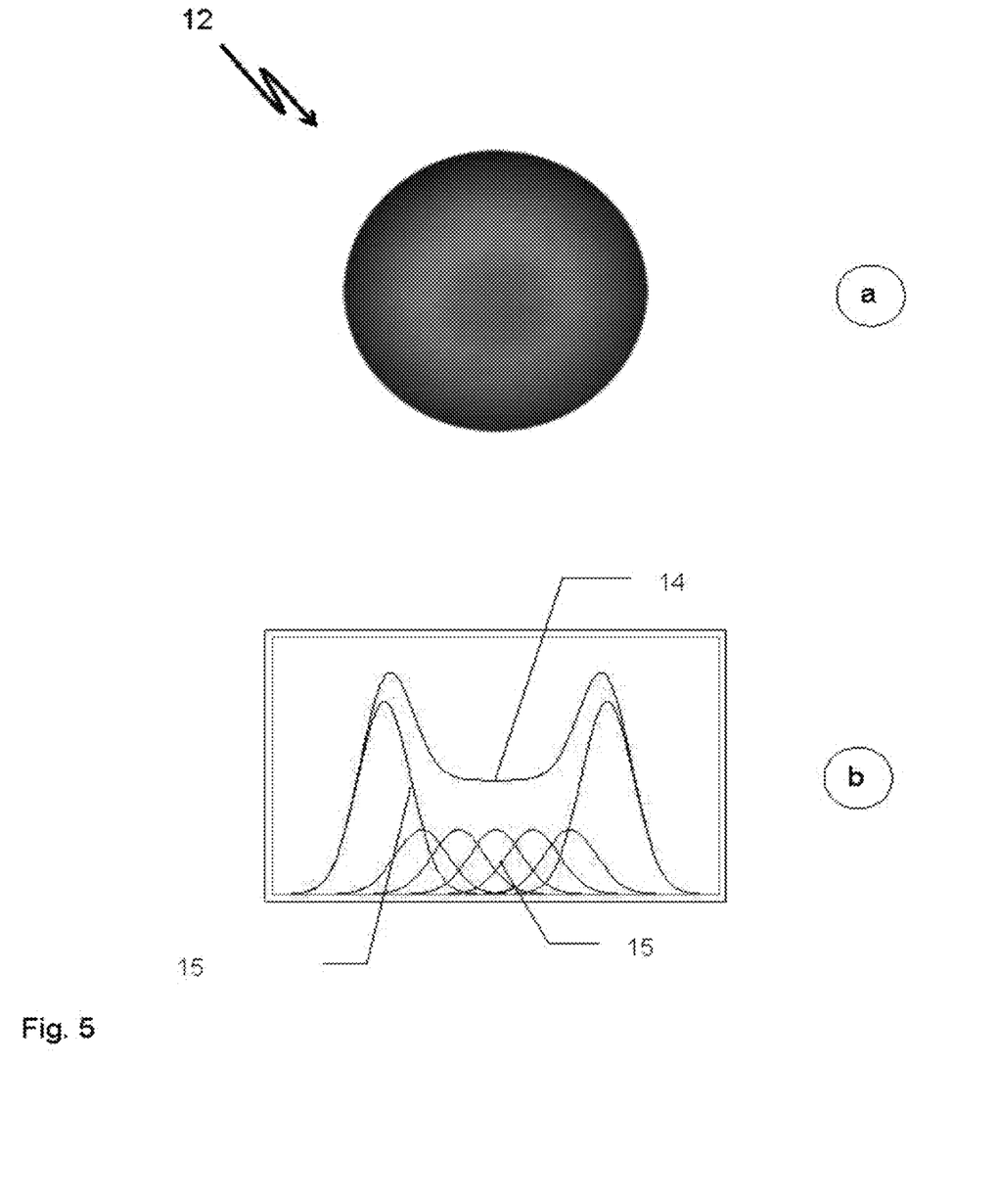
FIG. 5 shows a laser light spot of a diode laser (FIG. 5a) and a cross-section through the associated beam profile (FIG. 5b), with a DOE arranged in front of the focusing lens and an intensity of the laterally overlapping partial laser beams that increases towards the edge.

FIGS. 5a, 5b show a laser light spot 12 and the associated beam profile 14 that is also formed by laterally overlapping partial laser beams 9. In contrast to the partial laser beams 9 associated with FIG. 4, these have no identical intensity. Compared with the partial laser beams 9 close to the center, the partial laser beams 9 close to the edge have a higher weighting in terms of intensity. This results in a cup-shaped beam profile 14, with a central flat area, rising sections adjacent to this, and with steeply sloping flanks outside at the edge. In the central area and in the edge area of the resulting laser beam 8, the partial beam profiles 15 have different heights and they are added in the same way as described in FIG. 4, resulting in a continuous beam profile 14.

Figure 6:
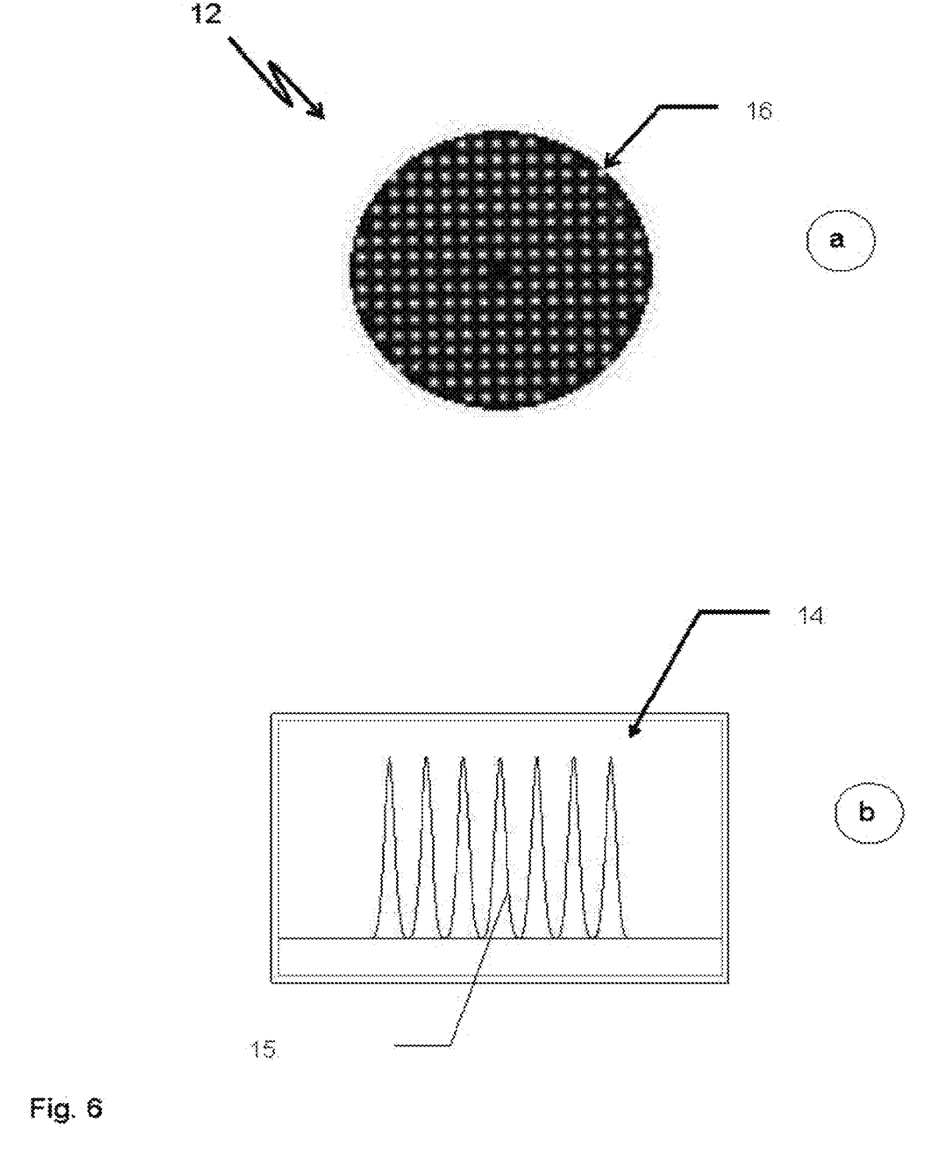
FIG. 6 shows a laser light spot of a diode laser (FIG. 6a) and a cross-section through the associated beam profile (FIG. 6b), with a DOE arranged in front of the focusing lens and a uniform intensity of the laterally non-overlapping partial laser beams.
Figure 7:
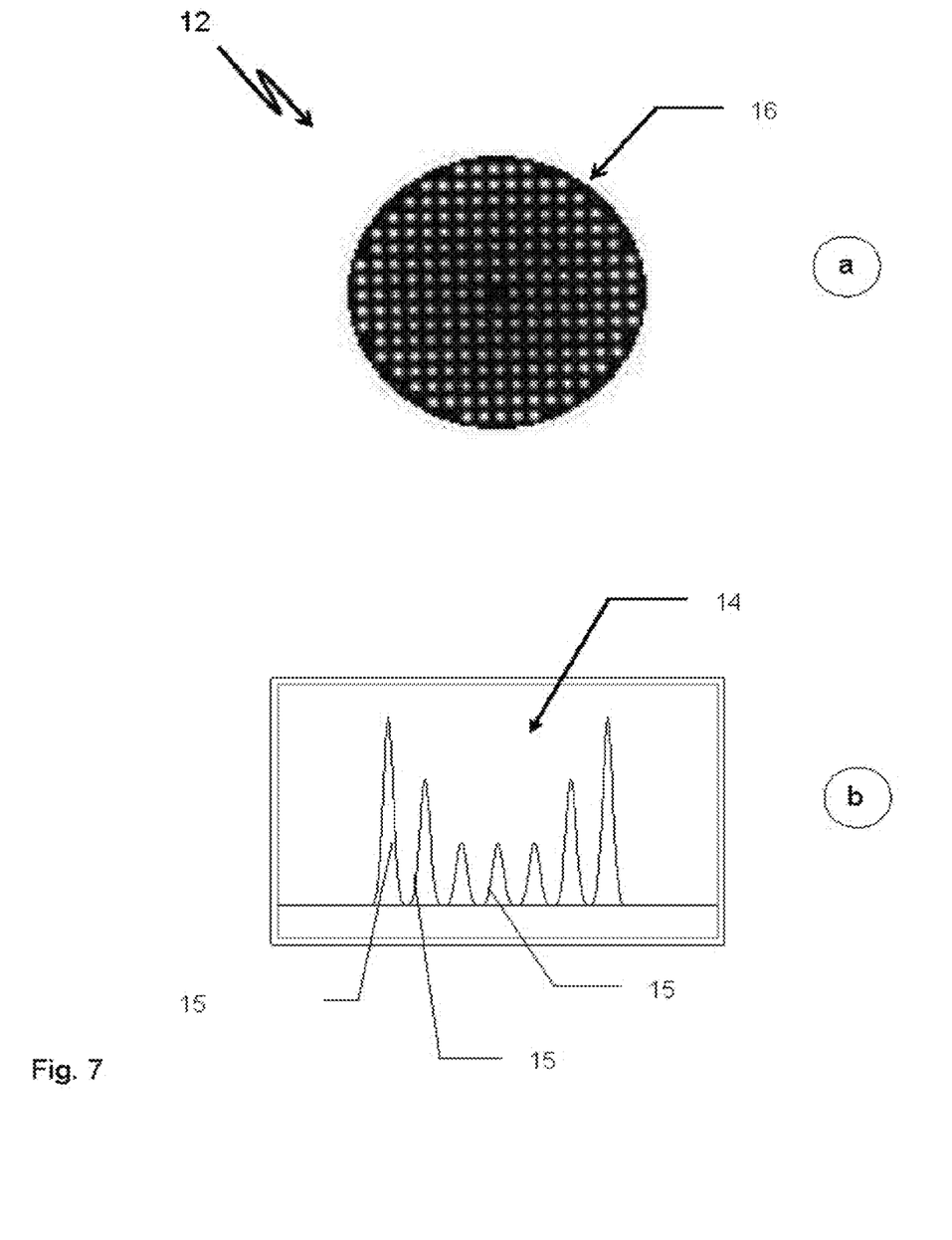
FIG. 7 shows a laser light spot of a diode laser (FIG. 7a) and a cross-section through the associated beam profile (FIG. 7b), with a DOE arranged in front of the focusing lens and an intensity of the laterally non-overlapping partial laser beams that increases towards the edge.

FIGS. 6, 7 each show a laser light spot 12 with a beam profile 14 that has a two-dimensional pattern of spaced discrete points 16. The original laser beam 6 originates at a fiber laser that differs from a diode laser essentially by having a distinctly better beam quality so that the partial laser beams 9 generated by it have partial beam profiles 15 that have a smaller width than with an original laser beam 6 originating from a diode laser. Due to the better convergence of the laser beam 6, the DOE 5 generates laterally spaced partial laser beams 9 that, as the resulting laser beam 8, generate a laser light spot 12 with gaps on the work piece 7, i.e. a discontinuous beam profile 14. After the addition of the partial beam profiles 15, the beam profile 14 comprising a grid of dots may be tophat-shaped or cup-shaped, according to the FIGS. 4, 5. Due to interactions in the material of the work pieces 7, the dotted pattern is brought together, preferably by thermal conductivity, to form a continuous active profile so that here, too, the processing of the work pieces 7 is continuous rather than consisting of the processing of separate dots. FIG. 6 shows the superimposition of separated partial beams 9 with uniform weighting of these partial beams 9, and FIG. 7 shows the superimposition of separated partial beams 9 with the intensity of the partial beams 9 increasing towards the outside.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A process for the adjustment of a laser light spot of high intensity for plastic welding of work pieces to be joined by means of a laser device comprising at least one laser emitting a laser beam and at least one focusing lens for converging the laser beam, as well as an optical operating element for adjusting the beam diameter of the laser beam, with the optical operating element configured as a diffractive optical element, the method comprising the steps of:
   configuring the diffractive optical element as having a number of standard cells and arranging said standard cells side-by-side with or without spacing;
   arranging the diffractive optical element between the laser and the focusing lens;
   emitting an original laser beam and directing said laser beam to the diffractive optical element;
   separating the original laser beam into a bundle of partial laser beams that are directed towards the focusing lens;
   enlarging a diameter of the bundle of partial laser beams in relation to a diameter of the original laser beam and therewith a diameter of the laser light spot to a desired dimension at the work pieces by means of the diffractive optical element, in the focal plane and transversely to an extension direction of the focal plane;
   focusing the partial laser beams that are generated from the original laser beam by means of the focusing lens and directing said partial laser beams at the work pieces with overlaps and/or gaps of any shape;
   assembling the partial laser beams to form a total laser beam that acts on a single processing spot as a laser light spot of high intensity; and
   moving the total laser beam relative to the work pieces;
   wherein a number, a lateral distance and a diameter of the partial laser beams as well as a total diameter of the total laser beam is determined by the diffractive optical element.

2. The process according to claim 1, wherein the partial laser beams generated by the diffractive optical element overlap at their edges, with a continuous beam profile being formed by the lateral overlap.

3. The process according to claim 1, wherein the partial laser beams generated by the diffractive optical element do not overlap at their edges, with a one-dimensional or two-dimensional beam profile of spaced discrete points being formed.

4. The process according to claim 3, wherein due to interactions in the material of the work pieces, a dotted pattern is brought together, preferably by thermal conductivity, to form a continuous active profile.

5. The process according to claim 1, wherein for the resulting beam profile, the partial laser beams generated by the diffractive optical element are weighted in terms of intensity and/or power so that different beam profiles for the laser light spot can be formed.

6. The process according to claim 5, wherein the beam profile of the resulting laser beam is determined at profile points determined by the coordinates (x, y) relative to the center of the laser light spot according to the function $$I(x, y) = \frac{P}{2\pi b} \frac{1}{\sqrt{b^2 - r^2}}$$

with b designating the radius, P the total intensity, and r the distance of the profile point in question from the center of the resulting laser beam.

7. The process according to claim 1, wherein interchangeable diffractive optical elements of different designs without precise alignment, in particular lateral alignment, relative to the laser beam exiting from the laser are used for the different adjustments of the laser light spot.

8. The process according to claim 1, wherein the diffractive optical element is arranged between a collimating lens downstream of the laser and the focusing lens.

9. A laser device for plastic welding of work pieces to be joined by means of a laser beam, comprising at least one laser emitting at least one laser beam and at least one focusing lens for converging the laser beam, as well as a diffractive optical element for adjusting the beam diameter of the laser beam, with the focusing lens generating a laser light spot of high intensity on the work pieces, with assembled partial laser beams generated by the diffractive optical element forming a resulting beam profile that is directed at a focal plane, wherein the diffractive optical element enlarges the diameter of the bundle or partial laser beams of the laser light spot on the work pieces to a desired dimension in the focal plane and transversely to an extension direction of the focal plane, wherein the partial laser beams generated out of the original laser beam are assembled with overlaps and/or gaps of any shape to form a total laser beam that is directed at a single processing spot of the work pieces and the total laser beam is moved relative to the work pieces, with a number, a lateral distance and a diameter of the partial laser beams as well as a total diameter of the total laser beam being determined by the diffractive optical element, and with a number of standard cells arranged side-by-side with or without spacing forming the diffractive optical element.

10. The laser device according to claim 9, wherein for the resulting beam profile, the partial laser beams generated by the diffractive optical element are weighted in such a way in terms of intensity and/or power that a beam profile that increases from the center towards the edge results for the laser light spot.

11. The laser device according to claim 9, wherein the diffractive optical element is arranged between a collimating lens downstream of the laser and the focusing lens.

12. The laser device according to claim 9, wherein the diffractive optical element is mounted interchangeably in the laser device and can be changed without precise alignment, especially laterally, in relation to the laser beam emitted by the laser.

13. The laser device according to claim 9, wherein the laser device is arranged in or on a processing head of a laser plastic welding device that comprises a scanner unit with at least one deflecting mirror.

14. The process according to claim 1, wherein the laser processing includes laser plastic welding of the work pieces in order to be joined.

15. The process according to claim 1, wherein the laser light spot is enlarged in the focal plane and transversely to the extension direction of the focal plane.

16. The process according to claim 6, wherein the beam profile is the beam intensity profile.

17. The laser device according to claim 9 wherein the laser light spot is enlarged in the focal plane and transversely to the extension direction of the focal plane.

\* \* \* \* \*